US006775605B2

(12) United States Patent
Rao et al.

(10) Patent No.: US 6,775,605 B2
(45) Date of Patent: Aug. 10, 2004

(54) REMOTE SENSING BASED PRE-CRASH THREAT ASSESSMENT SYSTEM

(75) Inventors: Manoharprasad K. Rao, Novi, MI (US); Kwaku O. Prakah-Asante, Commerce Township, MI (US); Md Abul Masrur, West Bloomfield, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 326 days.

(21) Appl. No.: 09/995,503

(22) Filed: Nov. 29, 2001

(65) Prior Publication Data

US 2003/0100982 A1 May 29, 2003

(51) Int. Cl.$^7$ ............... B60R 22/00; G05D 1/00; G06F 7/00; G06F 19/00
(52) U.S. Cl. ............... 701/45; 701/301; 280/733; 342/72; 350/435; 350/436; 702/143
(58) Field of Search ............... 701/45, 301, 1, 701/96; 700/304; 280/733, 806, 728.1; 342/70, 72; 340/435, 436, 903; 702/143

(56) References Cited

U.S. PATENT DOCUMENTS

| | | | |
|---|---|---|---|
| 3,514,610 A | 5/1970 | Huston et al. |
| 4,257,703 A | 3/1981 | Goodrich |
| 4,381,829 A | 5/1983 | Montaron |
| 4,623,966 A | 11/1986 | O'Sullivan |
| 4,638,289 A | 1/1987 | Zottnik |
| 4,673,937 A | 6/1987 | Davis |
| 4,833,469 A | 5/1989 | David |
| 4,916,450 A | 4/1990 | Davis |
| 4,969,103 A | 11/1990 | Maekawa |
| 4,992,943 A | 2/1991 | McCracken |
| 4,994,972 A | 2/1991 | Diller |
| 5,040,118 A | 8/1991 | Diller |
| 5,063,603 A | 11/1991 | Burt |
| 5,091,726 A | 2/1992 | Shyu |
| 5,162,794 A | 11/1992 | Seith |
| 5,166,881 A | 11/1992 | Akasu |
| 5,173,859 A | 12/1992 | Deering |
| 5,182,459 A | 1/1993 | Okano et al. |
| 5,230,400 A | 7/1993 | Kakinami et al. |
| 5,234,071 A | 8/1993 | Kajiwara |
| 5,249,157 A | 9/1993 | Taylor |
| 5,307,136 A | 4/1994 | Sanoyoshi |
| 5,314,037 A | 5/1994 | Shaw et al. |
| 5,430,432 A | 7/1995 | Camhi et al. |

(List continued on next page.)

FOREIGN PATENT DOCUMENTS

| EP | 0720928 A2 | 10/1996 |
|---|---|---|
| JP | 54-65934 A | 5/1979 |
| WO | WO 98/37435 | 8/1998 |
| WO | WO 98/58274 | 12/1998 |

*Primary Examiner*—Thomas G. Black
*Assistant Examiner*—Ronnie Mancho
(74) *Attorney, Agent, or Firm*—Frank A. MacKenzie; Artz & Artz

(57) ABSTRACT

A pre-crash assessment system (1) includes a host vehicle (3) in motion and a high frequency sensor (4), which detects position and relative velocity of a target object in the near zone of the host vehicle (3). A safety device actuator (5) is also coupled to the host vehicle (3). A pre-crash algorithm provides a comparison of a future position prediction of the target object relative to the host vehicle (3). A safety device controller (9) is coupled to the host vehicle (3). The controller (9) generates a threshold assessment based on the target object future relative position and relative velocity. The controller (9) also controls the safety device actuator (5) by providing an actuation signal. The controller (9) operates through logic designed to estimate whether a potential for crash between the host vehicle (3) and the target object is within the threshold for the safety device actuator (5). The controller (9) activates the safety device actuator 5 when the potential for crash is within the pre-determined threshold and safety device specific deployment criteria are met.

26 Claims, 3 Drawing Sheets

U.S. PATENT DOCUMENTS

| | | | |
|---|---|---|---|
| 5,467,283 A | 11/1995 | Butsuen et al. |
| 5,479,173 A | 12/1995 | Yoshioka et al. |
| 5,502,432 A | 3/1996 | Ohmamyuda et al. |
| 5,521,580 A | 5/1996 | Kaneko et al. |
| 5,526,269 A | 6/1996 | Ishibashi et al. |
| 5,534,870 A | 7/1996 | Avignon et al. |
| 5,541,590 A | 7/1996 | Nishio |
| 5,552,986 A | 9/1996 | Omura et al. |
| 5,572,428 A | 11/1996 | Ishida et al. |
| 5,574,463 A | 11/1996 | Shirai et al. |
| 5,594,414 A | 1/1997 | Namngani |
| 5,602,760 A | 2/1997 | Chacon et al. |
| 5,604,683 A | 2/1997 | Roecker |
| 5,629,847 A | 5/1997 | Shirakawa et al. |
| 5,635,922 A | 6/1997 | Cho et al. |
| 5,646,612 A | 7/1997 | Byon |
| 5,680,097 A | 10/1997 | Uemura et al. |
| 5,684,474 A | 11/1997 | Gilon et al. |
| 5,689,264 A | 11/1997 | Ishikawa et al. |
| 5,699,040 A | 12/1997 | Matsuda |
| 5,699,057 A | 12/1997 | Ikeda et al. |
| 5,710,565 A | 1/1998 | Shirai et al. |
| 5,745,870 A | 4/1998 | Yamamoto et al. |
| 5,748,477 A | 5/1998 | Katoh |
| 5,749,426 A | 5/1998 | Gilling |
| 5,751,211 A | 5/1998 | Shirai et al. |
| 5,751,836 A | 5/1998 | Wildes et al. |
| 5,754,099 A | 5/1998 | Nishimura et al. |
| 5,771,481 A | 6/1998 | Gilling |
| 5,779,264 A | 7/1998 | Demesseman et al. |
| 5,808,561 A | 9/1998 | Kinoshita et al. |
| 5,815,093 A | 9/1998 | Kikinis |
| 5,835,007 A | 11/1998 | Kosiak |
| 5,835,873 A | 11/1998 | Darby et al. |
| 5,838,228 A | 11/1998 | Clark |
| 5,847,472 A | 12/1998 | Byon |
| 5,847,755 A | 12/1998 | Wixson et al. |
| 5,872,536 A | 2/1999 | Lyons et al. |
| 5,905,457 A | 5/1999 | Rashid |
| 5,906,393 A | 5/1999 | Mazur et al. |
| 5,920,345 A | 7/1999 | Sauer |
| 5,926,126 A | 7/1999 | Engelman |
| 5,936,549 A | 8/1999 | Tsuchiya |
| 5,938,714 A | 8/1999 | Satonaka |
| 5,948,026 A | 9/1999 | Beemer, II et al. |
| 5,949,366 A | 9/1999 | Herrmann |
| 5,949,918 A | 9/1999 | McCaffrey |
| 5,955,967 A | 9/1999 | Yamada |
| 5,959,552 A | 9/1999 | Cho |
| 5,959,569 A * | 9/1999 | Khodabhai ................... 342/70 |
| 5,963,272 A | 10/1999 | Wixson |
| 5,964,822 A | 10/1999 | Alland et al. |
| 5,983,161 A | 11/1999 | Lemelson et al. |
| 5,995,037 A | 11/1999 | Matsuda et al. |
| 5,999,117 A | 12/1999 | Engel |
| 5,999,874 A | 12/1999 | Winner et al. |
| 6,002,983 A | 12/1999 | Alland et al. |
| 6,018,308 A | 1/2000 | Shirai |
| 6,025,797 A | 2/2000 | Kawai et al. |
| 6,026,340 A | 2/2000 | Corrado et al. |
| 6,031,484 A | 2/2000 | Bullinger et al. |
| 6,037,860 A | 3/2000 | Zander et al. |
| 6,044,166 A | 3/2000 | Bassman et al. |
| 6,044,321 A | 3/2000 | Nakamura et al. |
| 6,049,619 A | 4/2000 | Anandan et al. |
| 6,061,015 A | 5/2000 | Sugimoto |
| 6,076,028 A | 6/2000 | Donnelly et al. |
| 6,084,508 A | 7/2000 | Mai et al. |
| 6,085,151 A * | 7/2000 | Farmer et al. ............... 701/301 |
| 6,087,928 A | 7/2000 | Kleinberg et al. |
| 6,088,639 A | 7/2000 | Fayyad et al. |
| 6,094,159 A | 7/2000 | Oterfeld et al. |
| 6,097,332 A | 8/2000 | Crosby, II |
| 6,114,951 A | 9/2000 | Knioshita et al. |
| 6,121,896 A | 9/2000 | Rahman |
| 6,148,943 A | 11/2000 | Kodaka et al. |
| 6,151,539 A | 11/2000 | Bergholz et al. |
| 6,157,892 A | 12/2000 | Hada et al. |
| 6,161,074 A | 12/2000 | Sielagoski et al. |
| 6,168,198 B1 | 1/2001 | Breed et al. |
| 6,169,479 B1 | 1/2001 | Boran et al. |
| 6,177,866 B1 | 1/2001 | O'Connell |
| 6,185,490 B1 | 2/2001 | Ferguson |
| 6,188,316 B1 | 2/2001 | Matsuno et al. |
| 6,191,704 B1 | 2/2001 | Takenaga et al. |
| 6,816,539 | 2/2001 | Foo et al. |
| 6,204,756 B1 | 3/2001 | Senyk et al. |
| 6,209,909 B1 | 4/2001 | Breed |
| 6,218,960 B1 | 4/2001 | Ishikawa et al. |
| 6,219,606 B1 | 4/2001 | Wessels et al. |
| 6,223,125 B1 | 4/2001 | Hall |
| 6,225,918 B1 | 5/2001 | Kam |
| 6,226,389 B1 | 5/2001 | Lemelson et al. |
| 6,229,438 B1 | 5/2001 | Kutlucinar et al. |
| 6,246,961 B1 | 6/2001 | Sasaki et al. |
| 6,249,738 B1 | 6/2001 | Higashimata et al. |
| 6,256,584 B1 | 7/2001 | Kodaka et al. |
| 6,259,992 B1 | 7/2001 | Urai et al. |
| 6,405,132 B1 * | 6/2002 | Breed et al. ................ 701/301 |
| 6,420,996 B1 * | 7/2002 | Stopczynski et al. ......... 342/70 |
| 2002/0032515 A1 * | 3/2002 | Nakamura et al. ............ 701/96 |
| 2003/0060980 A1 * | 3/2003 | Prakah-Asante et al. .... 701/301 |

\* cited by examiner

REMOTE SENSING BASED PRE-CRASH THREAT ASSESSMENT SYSTEM

RELATED APPLICATIONS

This application relates to application file number 201-0400 entitled "Vehicle Sensing Based Pre-Crash Threat Assessment System," which is filed simultaneously herewith and incorporated by reference herein.

TECHNICAL FIELD

The present invention relates generally to crash detection systems for automotive vehicles, and more particularly to a pre-crash threat assessment system for a crash detection system.

BACKGROUND ART

Due to the current density of traffic on the roads, motor vehicle operators are flooded with information. Consequently, operating a motor vehicle is a complex procedure in which various situations arise where the operator has limited, little, or no time to react or to manually engage safety measures.

Many previously known crash detection systems have incorporated crash detection algorithms based on sensed data. The application of remote sensing systems using radar, lidar, and vision based technologies for object detection, tracking, alarm processing, and potential safety countermeasure deployment is well known in the art.

Based on range and bearing information provided by radar, lidar, or vision based systems and based on additional information obtained from the host vehicle sensors, various algorithms have been used to track the path of a host vehicle, to track the path of a target, and to estimate the future position of objects in the host vehicle path.

Safety systems, such as airbags and motorized safety belt pre-tensioners, activate after contact occurs between two vehicles. A typical accident occurs within 90 ms, whereas a typical airbag deploys within approximately 70 ms. Time minimization between the start of an accident and the start of safety system deployment is therefore crucial. Through accident prediction, additional time for safety system activation is generated.

Currently, accident prediction algorithms are employed primarily for accident warning/avoidance and operate typically within a range larger than 30 meters between host and target vehicles. In the event that a collision is unavoidable, however, the range is less than, and often considerably less than, 30 meters. Therefore, damage minimization techniques must predict an unavoidable collision and deploy safety measures within a short time.

The limitations associated with current accident damage minimization techniques have made it apparent that a new technique to minimize damage to a vehicle or vehicle operator is needed. The new technique should predict a target vehicle position with respect to a host vehicle and should also substantially minimize the computational time for threat assessment calculations. The present invention is directed to these ends.

SUMMARY OF THE INVENTION

The present invention provides a remote, non-contact sensing based pre-crash threat assessment system. The present invention also provides a non-contact sensor-based pre-crash threat assessment system for an automobile.

In accordance with the present invention, a pre-crash assessment system, which includes a host vehicle in motion, is disclosed. A radar sensor is coupled to the host vehicle. It is to be understood, however, that alternate embodiments of the present invention will use numerous other sensor types and combinations of sensor types. The radar sensor substantially detects position and relative velocity of a first object in the near zone of the host vehicle. Generally, a near zone is less than thirty meters. A first safety device actuator is also coupled to the host vehicle. This actuator activates a first safety device. A pre-crash algorithm having a first threshold is determined through a comparison of a future position prediction of the first object relative to the host object and a fraction of the host object width plus an adjustable tolerance zone. The adjustable tolerance zone is a function of the last measured position, the direction of travel and the position of the target object when it comes in line with the front of the host vehicle. A safety device controller is coupled to the host vehicle. The controller generates a threshold assessment based on host vehicle dynamics and radar sensor measurements. The controller also controls the first safety device actuator by sending a command signal. The controller operates through logic designed to estimate whether a potential for crash between the host vehicle and the first object is within the first threshold for the first safety device actuator.

A future position prediction of the first object relative to the host vehicle is determined. The controller activates the first safety device actuator when a value for the potential for crash is within the first threshold and the safety device specific deployment criteria are met.

Advantages of the current invention are that remote sensing position and bearing information of a target object in the near vicinity of the host vehicle are used and threat assessment is made through a fast, robust and reliable algorithm. Fast algorithms allow more decision making time on the part of vehicle controllers and more deployment time for safety devices and are therefore preferable.

Additional advantages and features of the present invention will become apparent from the description that follows and may be realized by the instrumentalities and combinations particularly pointed out in the appended claims, taken in conjunction with the accompanying drawings.

DETAILED DESCRIPTION

The present invention is illustrated with respect to a pre-crash threat assessment and safety device activation system, particularly suited to the automotive field. The present invention is, however, applicable to various other uses that may require pre-crash threat assessment, as will be understood by one skilled in the art.

Figure 1:
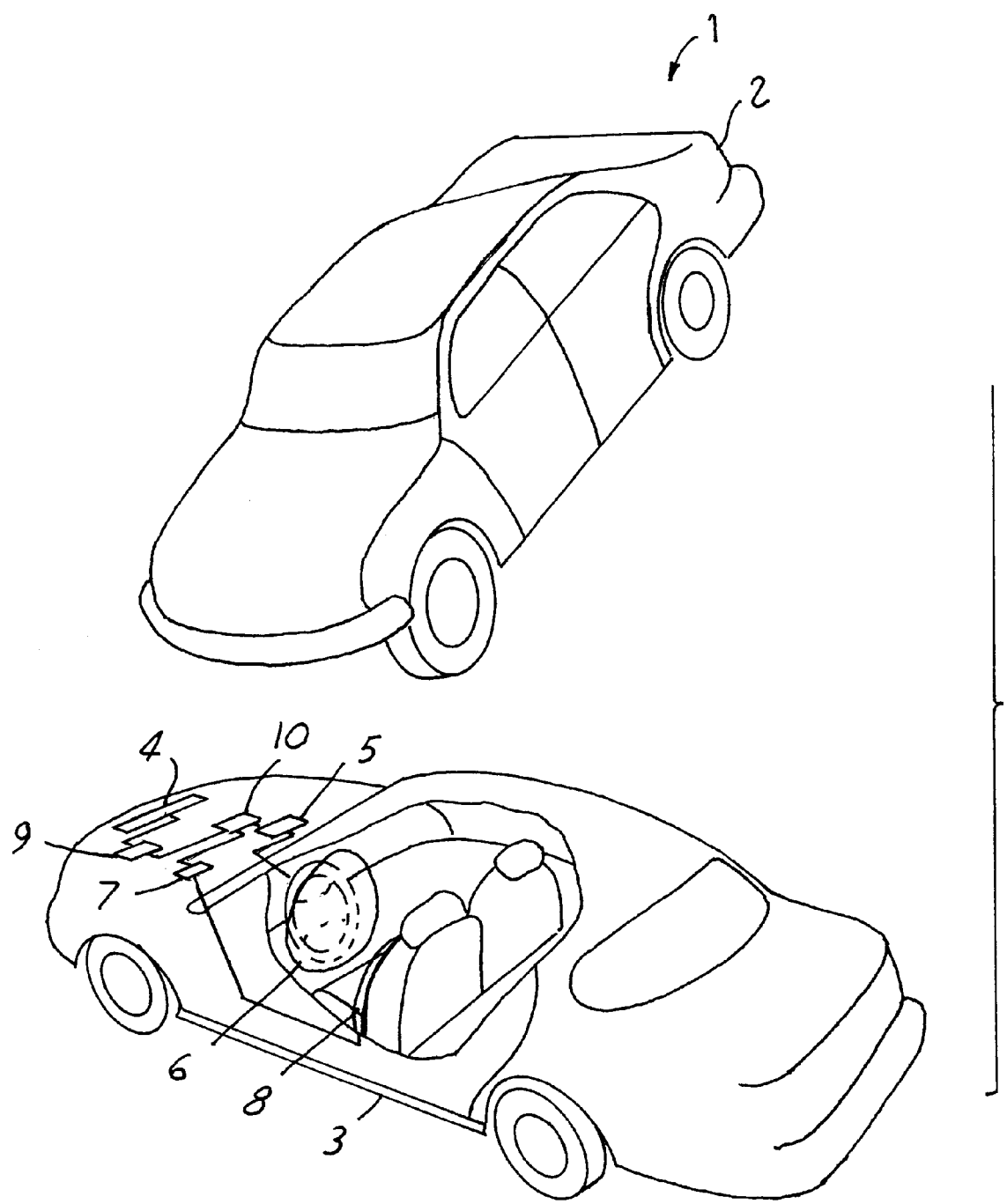
FIG. 1 is a pre-crash assessment system in accordance with a preferred embodiment of the present invention.

Referring to FIG. 1, a pre-crash assessment system 1, including a first target object (here illustrated as a first target vehicle 2) imminently colliding with a host vehicle 3, is illustrated. The pre-crash assessment system includes a high frequency remote sensor (or remote sensing system, as will be understood by one skilled in the art) 4 coupled to the host vehicle 3. The sensor 4 detects vehicle states of the first target vehicle 2. Examples of the vehicle states are position and velocity.

The first safety device actuator 5 is coupled to the host vehicle 3. This actuator 5 pre-arms the first safety device 6, here embodied as a pre-arming device for an airbag. The second safety device actuator 7 is also coupled to the host vehicle 3. The second safety device actuator 7 activates a second safety device 8, here embodied as a motorized safety belt pre-tensioner. Important to note is that numerous actuators and safety devices may be added to the system as needed by the manufacturer.

The safety device controller 9 is also coupled to the host vehicle 3. From the remote sensing system detected target vehicle states, the safety device controller 9 calculates target vehicle dynamics with respect to the host vehicle. Examples of target vehicle dynamics are velocities and accelerations. The safety device controller 9 generates a threshold assessment based on the sensed target vehicle dynamics. The safety device controller 9 also generates a control signal based on the host vehicle dynamics. The sensed information, in conjunction with host vehicle dynamic information, is used by the controller for countermeasure activation decision making. The controller 9 estimates whether a potential for crash between the host vehicle 3 and the first target vehicle 2 is within the first threshold for the first safety device actuator 5. The controller 9 also estimates whether a potential for crash between the host vehicle 3 and the first target vehicle 2 is within the second threshold for the second safety device actuator 7.

In the current embodiment, the estimation is made through a pre-crash algorithm. The algorithm is defined by the comparison of the predicted position of the target object, when the front of the target vehicle is in line with the front of the host vehicle 3 (i.e., when it is in the OX plane of the coordinate system, which is illustrated at the front of the host vehicle 3), with a fraction of the host vehicle width (ideally half the width (W/2)) plus additional adjustable tolerance allowed by the host vehicle systems. The fraction of width used is dependent on host vehicle parameters. The adjustable tolerance zone is a function of the last measured position of the target object, the target object direction of travel and the target object position when it comes in line with the front of the host vehicle.

The fraction of the width and the adjustable tolerance values are either pre-set into the system 12 during manufacture or later through a separate sensor that reads vehicle dimensions, which is subsequently attached to the host vehicle 3. The threat is severe, and, in the current embodiment, within the first actuator threshold when the target vehicle 2 predicted position is less than the fraction of width used. The threat is severe, and, in the current embodiment, within the second actuator threshold when the target vehicle predicted position is substantially less than the fraction of width used.

The safety device controller 9 further sends control signals to the host vehicle Controller Area Network Bus (CAN) 10, which controls the first safety device actuator 5 and the second safety device actuator 7 in response to threat assessment evaluations, as will be understood by one skilled in the art. The operations of the controller 9 will be discussed in detail later.

Figure 2:
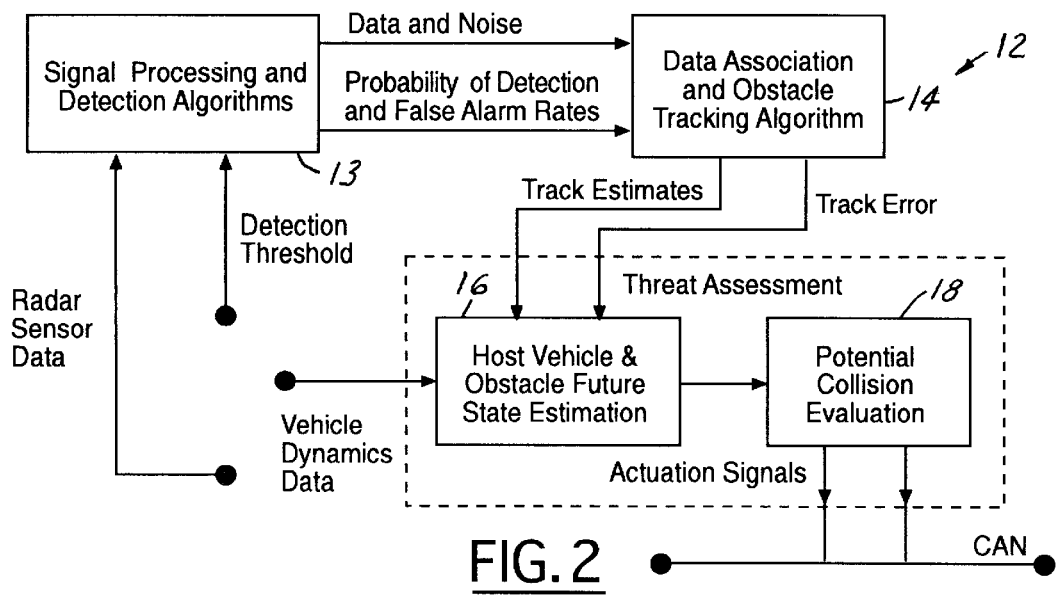
FIG. 2 is a block diagram of a remote sensing based pre-crash threat assessment system in accordance with a preferred embodiment of the present invention.

Referring to FIG. 2, a block-diagram of the remote sensing based pre-crash threat assessment system 12, is illustrated. The current invention addresses only threat assessment aspects of the system 12 (for pre-crash sensing purposes) with radar, lidar, or vision sensor based remote sensing systems.

The system 12 starts when operation block 13, which engages signal processing and detection algorithms, receives radar sensor data and predetermined detection thresholds. The radar sensor data is generated when an object impedes the radar pulse and reflects the pulse back to the radar sensor on the host vehicle. The detection thresholds are pre-set based on vehicle specific acceptable probability of detection and false alarm rates. Subsequently, operation block 13 sends the data and noise accompanying the signal, as will be understood by one skilled in the art, to operation block 14. The probability of detection and false alarm rates have significant effects on track initiation and track quality.

Operation block 14 associates the data from operation block 13 and engages an object tracking algorithm. Operation block 14 then sends the calculated track estimates of the object and the tracking error estimate signals to operation block 16, as will be understood by one skilled in the art.

Host vehicle dynamic data is also sent to the operation block 16 from the host vehicle dynamic sensing systems. Using this combination of received data, operation block 16 estimates the future states of the host vehicle and target object and sends this data to operation block 18. An evaluation is then made in operation block 18 of the potential for collision between the host vehicle and the target object. Operation blocks 16 and 18 are the threat assessment portion of the system 12, which will be discussed in detail later. Operation block 18 also evaluates whether the countermeasure activation criteria are met for various countermeasure actions under consideration. Subsequently, operation block 18 sends actuation signals to the Controller Area Network Bus (CAN) of the host vehicle, which engages the safety devices (countermeasures), as will be understood by one skilled in the art.

In the current invention, the host vehicle dynamics data is used for evaluating countermeasure deployment criteria only. Host vehicle dynamic data is not used to predict the future state of the object with respect to the host vehicle. Instead, the object future state, with respect to the host vehicle future state, is predicted through remote sensor obtained object position and bearing data (as a function of time).

Figure 3:
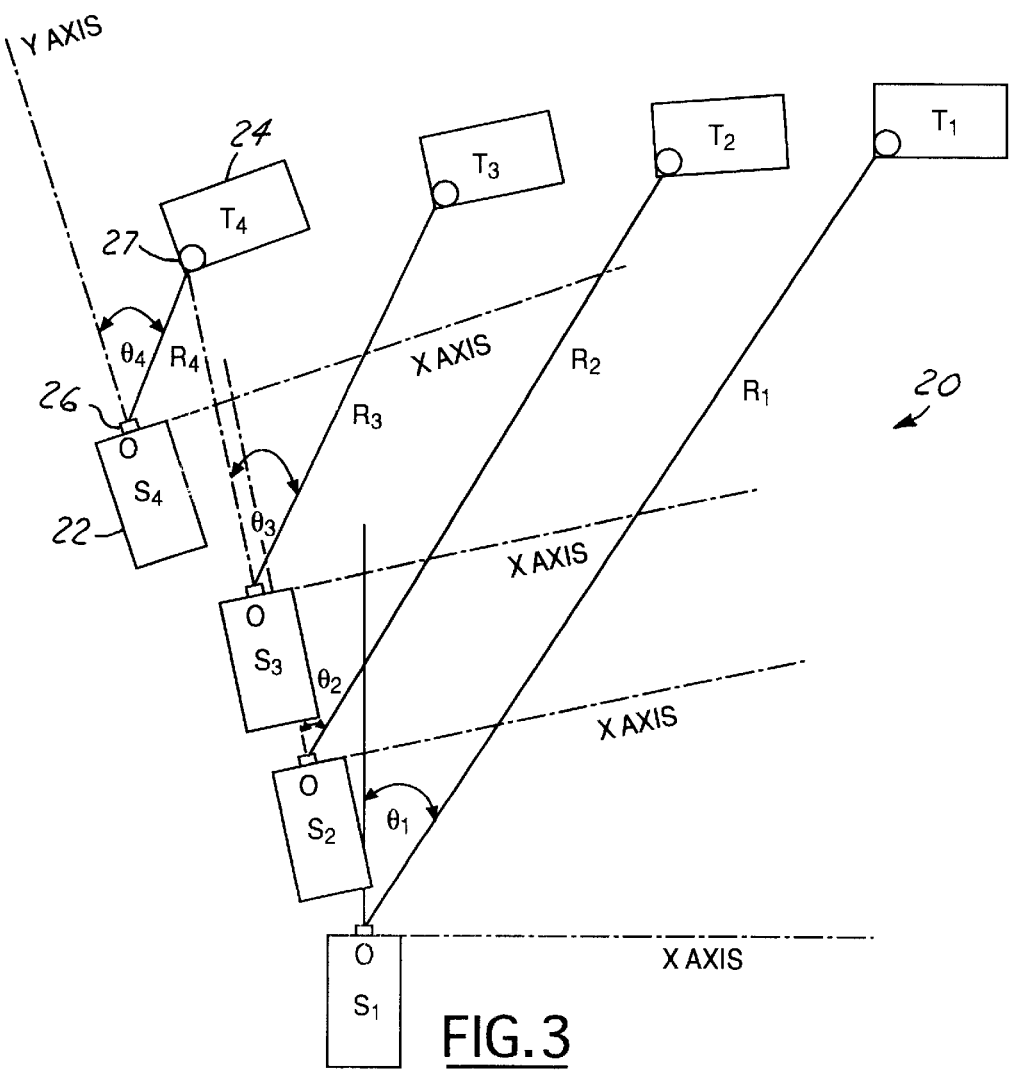
FIG. 3 is an exemplary illustration of a pre-crash scenario in accordance with a preferred embodiment of the present invention.

The embodied approach is further clarified in FIG. 3, which illustrates an example of a pre-crash scenario 20. $S_1$, $S_2$, $S_3$ and $S_4$ are the positions of the host vehicle 22 at four consecutive times $t_1$, $t_2$, $t_3$ and $t_4$ respectively. $T_1$, $T_2$, $T_3$ and $T_4$ are the positions of a target object (ideally a target vehicle) 24 being tracked by the remote sensing system 12. Multiple objects are typically tracked, but to explain the embodiment, only the object that has the highest potential for crash is shown. R is the radial distance from the origin of the coordinate system, which is positioned at the front centerline of the host vehicle, to the nearest scattering center 27 of the target object 24. θ is the angle made by the nearest scattering center on the target object 24 with the Y-axis of the coordinate system. The radar sensor 26 is ideally attached to the front of the host vehicle 22. The Y-axis of a coordinate system is configured along the front central line of the host vehicle 22. In the Cartesian coordinate system, with origin at 0 on the host vehicle 22:

$X_1=R_1 \sin(\theta_1)$ and $Y_1=R_1 \cos(\theta_1)$ at time $t_1$,
$X_2=R_2 \sin(\theta_2)$ and $Y_2=R_2 \cos(\theta_2)$ at time $t_2$,
$X_3=R_3 \sin(\theta_3)$ and $Y_3=R_3 \cos(\theta_3)$ at time $t_3$ and
$X_4=R_4 \sin(\theta_4)$ and $Y_4=R_4 \cos(\theta_4)$ at time $t_4$.

In this manner, the X and Y coordinates of the target object 24 with respect to the coordinate system, fixed to the host vehicle and moving therewith, is determined as a function of time, which is here represented as: $t_1$, $t_2$, $t_3$ and $t_4$. By a numerical differentiation process, as will be understood by one skilled in the art, the X and Y components of the target object 24 velocities and accelerations are obtained. When Doppler velocity measurement capable radar or lidar sensors are used, the relative velocity information can be directly measured. In this situation, only X and Y components of the acceleration data need to be calculated using numerical differentiation procedures.

From the Y component of current position (e.g. $Y_4$ corresponding to $T_4$) and Y components of velocity (e.g. $V_{y4}$) and acceleration (e.g. $A_{y4}$), with respect to the moving coordinate system OXY, the time ($t_p$) required for the target object 24 to be line OX is calculated through the equation:

$$t_p = \frac{-V_{Y4} \pm \sqrt{(V_{Y4})^2 + 2*(A_{Y4})*(Y_4)}}{(A_{Y4})}.$$

From the X component of the current position (e.g. $X_4$) and the X component of velocity (e.g. $V_{x4}$) and acceleration (e.g. $A_{x4}$), with respect to the moving coordinate system OXY, and the time ($t_p$) at which the target object 24 will be on line OX, the X position at time ($t_p$) is predicted through the equation:

$$X_{tp}=X_4+V_{X4}*t_p+0.5*A_{X4}*(t_p)^2.$$

The severity of threat (confidence level) is then assessed by comparing this predicted $X_{tp}$ position (X at time $t_p$) with a fraction of the host vehicle width (ideally half the width (W/2)) plus additional variable tolerance allowed by the host vehicle systems. The threat is severe, and, in the current embodiment, within the first actuator threshold when the target vehicle predicted position ($X_{tp}$) is less than the fraction of width used. The threat is severe, and, in the current embodiment, within the second actuator threshold when the target vehicle predicted position ($X_{tp}$) is substantially less than the fraction of width used. This algorithm employs only the remote sensing system-based measurements. This algorithm uses substantially less time to run than previous algorithms, which also considered the vehicle dynamics of the host vehicle in the evaluation of the crash assessment situations. Through this algorithm, the system substantially achieves the goal of providing a threat assessment means with short computational time requirements for threat assessment evaluations, thus providing more time for deployment of necessary countermeasures in a non-avoidable collision situation.

Figure 4:
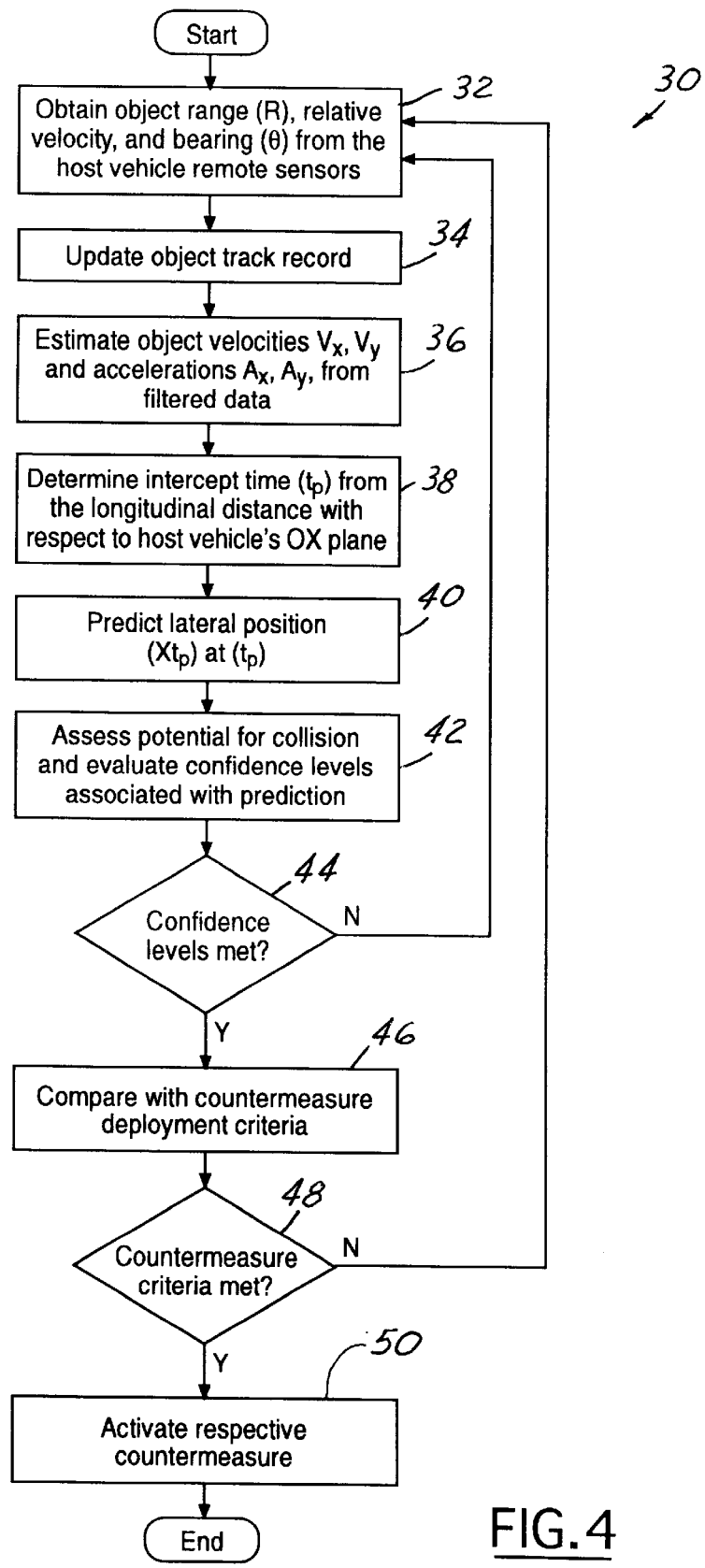
FIG. 4 is a block diagram of a pre-crash threat assessment and safety device activation system in accordance with a preferred embodiment of the present invention.

In FIG. 4, in view of and referencing components illustrated in FIG. 2 and FIG. 3, a block diagram of the operation of a pre-crash threat assessment and safety device activation system 30, in accordance with one embodiment of the present invention, is illustrated. The logic starts in operation block 32 by obtaining the range (R) and the bearing ($\theta$) of the target object 24 from the host vehicle remote sensor 26. Subsequently, operation block 34 activates and the object track record is updated from the data sent from operation block 32.

Operation block 36 then activates, and logic operative to estimate the velocity ($V_y$) and acceleration ($A_y$) of the target object 24 is engaged. The data from operation block 34 is ideally filtered prior to estimation in operation block 36, as will be understood by one skilled in the art.

Operation block 38 then activates, which uses the longitudinal distance with respect to the 0X plane, and calculates the intercept time ($t_p$) of the target object 24. From this intercept time ($t_p$), operation block 40 activates and logic is engaged, operative to predict the lateral position (X at time $t_p$) of the target object 24, as was previously discussed.

Operation block 42 subsequently activates and assesses the potential for collision and evaluates the confidence levels associated with the position prediction. The confidence levels are the thresholds within which the safety device controller, incorporated in the host vehicle 22, activates a countermeasure in response to the position prediction and the meeting of device specific deployment criteria. The confidence levels are assessed, in the current embodiment, by comparing the predicted $X_{tp}$ position (X at time $t_p$) with the host vehicle half width (W/2) plus additional variable tolerance allowed by the host vehicle systems.

A decision is then made in inquiry block 44 as to whether controller confidence levels are met. For a negative response, operation block 32 again is performed and the block diagram 30 operates for a subsequent position, velocity and acceleration of the target object 24 with respect to the host vehicle 22.

Otherwise, the confidence levels are compared to the threshold of the first safety device (embodied as a pre-arming device for an airbag) and the threshold of the second safety device (embodied as a motorized belt pre-tensioner) in operation block 46. These threshold comparisons and safety device specific criteria are used to reach the countermeasure deployment decision.

A determination is then made in inquiry block 48 as to whether either safety device deployment criterion is met. Two safety device thresholds for two safety devices are included in the current embodiment, however numerous other safety device thresholds for numerous other safety devices may be added as needed for vehicle safety. In operation block 50, if either safety device deployment criterion is met, the controller sends a signal to the first safety device actuator or the second safety device actuator for the respective countermeasure (safety device) activation.

Otherwise, operation block 32 again activates and the block diagram 30 operates for a subsequent position, velocity and acceleration of the target object 24 with respect to the host vehicle 22.

The current embodiment combines this efficient approach for threat assessment with advanced techniques for radar based object tracking. The quality of threat assessment depends upon the quality of tracking. Advanced filtering and tracking techniques such as: Alpha-Beta-Gamma filtering and adaptive Kalman filtering are used to initiate and maintain quality tracks for objects in the near zone of the host vehicle. These filtering and tracking techniques improve the reliability, robustness, and confidence levels of the threat assessment predictions without significantly sacrificing processing speeds, as will be understood by one skilled in the art.

In operation, in view of FIG. 3, when a target object 24 comes in range of the radar sensor 26 of the host vehicle 22, logic operates to track the target object 24 and estimate the future position, velocity and acceleration of the target object 24 relative to the host vehicle 22. An assessment is then conducted for the confidence of collision and whether the collision will require pre-arming the airbag or activating the motorized belt pre-tensioners. Ideally, to minimize nuisance activation, the motorized belt pre-tensioner is activated when there is a higher certainty of collision. A lower threshold is used for pre-arming the airbag.

From the foregoing, it can be seen that there has been brought to the art a new remote sensing based pre-crash threat assessment system. It is to be understood that the preceding description of the preferred embodiment is merely illustrative of some of the many specific embodiments that represent applications of the principles of the present invention. Numerous and other arrangements would be evident to those skilled in the art without departing from the scope of the invention as defined by the following claims.

What is claimed is:

1. A pre-crash assessment system, including a first target object in a near zone of a host object in motion, comprising:
   a remote sensor coupled to the host object for detecting a dynamic characteristic of the first target object in relation to the host vehicle;
   a first safety device actuator, coupled to the host object, for activating a first safety device;
   a pre-crash algorithm having a first threshold defined by a comparison of a future position prediction of the first target object relative to the host object and a fraction of a width of the host object; and
   a safety device controller, coupled to the host object for generating a threshold assessment based on said dynamic characteristic, said controller estimating whether a potential for crash between the host object and the first target object is within said first threshold for said first safety device actuator, said safety device controller further controlling said first safety device actuator in response to said threshold assessment.

2. The system of claim 1, further comprising multiple target objects in the near zone of the host object.

3. The system of claim 1, wherein said controller further comprises a tracking filter.

4. The system of claim 1, wherein a pre-arming device for an airbag comprises said first safety device.

5. The system of claim 1, wherein a motorized safety belt pre-tensioner comprises said first safety device.

6. The system of claim 1, wherein a lidar sensor comprises said remote sensor.

7. The system of claim 1, wherein a radar sensor system comprises said remote sensor.

8. The system of claim 1, wherein a vision system comprises said remote sensor.

9. The system of claim 1, wherein a combination of radar, lidar and vision systems comprise said remote sensor.

10. The system of claim 1, wherein said first safety device actuator responds to said first threshold in combination with safety device specific deployment criteria.

11. A method for pre-crash threat assessment for a moving host vehicle, comprising:
   sensing a target vehicle in a near zone of the host vehicle;
   tracking a current vehicle dynamic of said target vehicle with respect to the host vehicle;
   calculating a future position of said target vehicle with respect to the host vehicle based on said vehicle dynamic of said target vehicle;
   calculating a potential for collision by comparing said future position of said target vehicle to a fraction of a width of the host vehicle; and
   determining whether said potential for collision of the host vehicle and said target vehicle is within a first pre-determined safety threshold.

12. The method of claim 11, wherein said step of sensing further comprises the step of sensing multiple target vehicles in the near zone of the host vehicle.

13. The method of claim 11, wherein said step of calculating a future position of said target vehicle further comprises the step of filtering a current position of said target vehicle.

14. The method of claim 11 wherein said step of estimating further comprises the step of estimating an acceleration of said target vehicle.

15. The method of claim 11, wherein said step of determining further comprises the step of determining whether said potential for collision of the host vehicle and said target vehicle is within a second pre-determined safety threshold.

16. The method of claim 15, wherein the step of determining whether said potential for collision of the host vehicle and said target vehicle is within a second pre-determined safety threshold further comprises activating a second actuator in response to said second pre-determined safety threshold in combination with safety device specific deployment criteria.

17. The method of claim 11, wherein the step of determining further comprises the step of activating a first safety device actuator in response to said first pre-determined safety threshold in combination with safety device specific deployment criteria.

18. A pre-crash assessment system, including a first target object in a near zone of a host vehicle, comprising:
   a high frequency remote sensor, coupled to the host vehicle, for detecting a vehicle dynamic of the first target object;
   a first safety device actuator, coupled to the host vehicle for activating a first safety device;
   a first pre-crash algorithm having a first threshold determined through a comparison of a future position prediction of the first target object relative to the host vehicle and a fraction of a width of the host vehicle;
   a second safety device actuator, coupled to the host vehicle, for activating a second safety device;
   a second pre-crash algorithm having a second threshold determined through a comparison of a future position prediction of the first target object relative to the host vehicle and a fraction of a width of the host vehicle; and
   a safety device controller, coupled to the host vehicle for generating a threshold assessment based on said vehicle dynamic, said controller estimating whether a potential for crash between the host vehicle and the first target object is within said first threshold for said first safety device actuator and said second threshold for said second safety device actuator, said safety device controller further controlling said first safety device actuator in response to said threshold assessment.

19. The system of claim 18, further comprising multiple target objects in the near zone of the host vehicle.

20. The system of claim 18, wherein said controller further comprises a tracking filter.

21. The system of claim 18, wherein a pre-arming device for an airbag comprises said first safety device.

22. The system of claim 18, wherein a motorized safety belt pre-tensioner comprises said second safety device.

23. The system of claim 18, wherein a lidar sensor comprises said high frequency remote sensor.

24. The system of claim 18, wherein a vision system comprises said remote sensor.

25. The system of claim 18, wherein a combination of radar, lidar and vision systems comprise said remote sensor.

26. The system of claim 18, wherein a radar sensing system comprises said high frequency remote sensor.

* * * * *